(12) United States Patent
Notani

(10) Patent No.: US 9,074,573 B2
(45) Date of Patent: Jul. 7, 2015

(54) SYSTEM FOR CRANKING INTERNAL COMBUSTION ENGINE BY ENGAGEMENT OF PINION WITH RING GEAR

(75) Inventor: Hideya Notani, Kariya (JP)

(73) Assignee: DENSO CORPORATION, Kariya (JP)

( * ) Notice: Subject to any disclaimer, the term of this patent is extended or adjusted under 35 U.S.C. 154(b) by 1009 days.

(21) Appl. No.: 13/196,315

(22) Filed: Aug. 2, 2011

(65) Prior Publication Data

US 2012/0029797 A1 Feb. 2, 2012

(30) Foreign Application Priority Data

Aug. 2, 2010 (JP) .................................. 2010-173606

(51) Int. Cl.
*F02N 11/08* (2006.01)

(52) U.S. Cl.
CPC ......... *F02N 11/0855* (2013.01); *F02N 11/0851* (2013.01); *F02N 11/0844* (2013.01); *F02N 2200/022* (2013.01); *F02N 2300/2006* (2013.01); *Y02T 10/48* (2013.01)

(58) Field of Classification Search
CPC F02D 41/042; F02N 11/0851; F02N 11/0855
USPC .................................. 123/179.4; 701/112, 113
See application file for complete search history.

(56) References Cited

U.S. PATENT DOCUMENTS

| 7,562,650 B2 * | 7/2009 | Tabata et al. ................... 123/491 |
| 8,036,815 B2 * | 10/2011 | Okumoto et al. .............. 701/110 |
| 8,131,452 B2 * | 3/2012 | Senda et al. ................... 701/110 |
| 8,498,772 B2 * | 7/2013 | Kanemoto et al. ........... 701/29.1 |
| 8,631,778 B2 * | 1/2014 | Moriya et al. .............. 123/179.4 |
| 2004/0149251 A1 | 8/2004 | Nishikawa et al. |
| 2006/0129305 A1 | 6/2006 | Nishikawa et al. |
| 2010/0059007 A1 | 3/2010 | Senda et al. |
| 2010/0180849 A1 * | 7/2010 | Senda et al. ................ 123/179.4 |

(Continued)

FOREIGN PATENT DOCUMENTS

| CN | 101709682 A | 5/2010 |
| JP | A-2004-245106 | 9/2004 |
| JP | B2-4211208 | 1/2009 |
| JP | A-2010-084754 | 4/2010 |

OTHER PUBLICATIONS

Chinese Office Action issued in Application No. 201110226764.9; Dated Jul. 4, 2013 (With Translation).

(Continued)

*Primary Examiner* — Hai Huynh
*Assistant Examiner* — Raza Najmuddin
(74) *Attorney, Agent, or Firm* — Oliff PLC

(57) ABSTRACT

In a system, a predictor predicts a future trajectory of a rotational speed of a crankshaft during drop of the crankshaft's rotational speed in a forward rotational direction due to automatic stop of an engine. An engaging unit shifts, in response to when an engine restart condition is met during the drop of the crankshaft's rotational speed, a pinion to a ring gear for engaging the pinion with the ring gear. An engagement determiner determines, based on the future trajectory of the crankshaft's rotational speed, whether the pinion and the ring gear will be shifted to engagement state therebetween during reverse rotation of the output shaft. A controller controls, based on a result of the determination by the engagement determiner, at least one of: a start timing to shift the pinion to the ring gear by the engaging unit, and a start timing to energize the motor.

5 Claims, 4 Drawing Sheets

(56) References Cited

U.S. PATENT DOCUMENTS

| | | | |
|---|---|---|---|
| 2011/0137544 A1* | 6/2011 | Kawazu et al. | 701/113 |
| 2012/0199090 A1* | 8/2012 | Kitano et al. | 123/179.4 |
| 2013/0255614 A1* | 10/2013 | Kitano et al. | 123/179.4 |
| 2013/0325246 A1* | 12/2013 | Roessle et al. | 701/29.1 |

OTHER PUBLICATIONS

Oct. 1, 2013 Japanese Office Action issued in Japanese Application No. 2010-173606 (with translation).

* cited by examiner

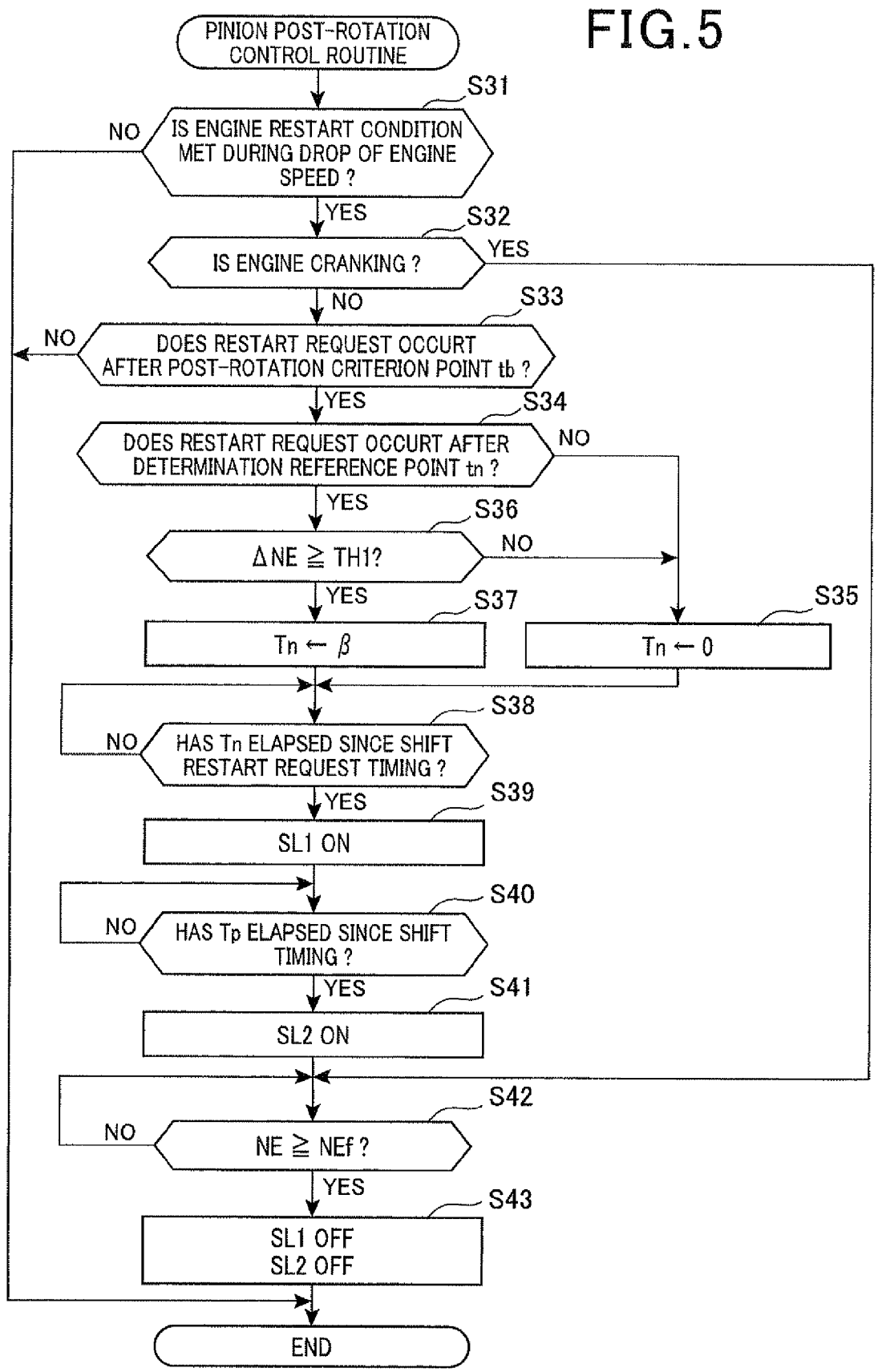

SYSTEM FOR CRANKING INTERNAL COMBUSTION ENGINE BY ENGAGEMENT OF PINION WITH RING GEAR

CROSS REFERENCE TO RELATED APPLICATIONS

This application is based on Japanese Patent Application 2010-173606 filed on Aug. 2, 2010. This application claims the benefit of priority from the Japanese Patent Application, so that the descriptions of which are all incorporated herein by reference.

TECHNICAL FIELD

The present disclosure relate to systems for cranking an internal combustion engine by engagement of a pinion of a starter with a ring gear coupled to an output shaft of the internal combustion engine.

BACKGROUND

Engine stop-and-start systems, such as idle reduction control systems, have been recently developed. Such engine stop-and-start systems are designed to automatically stop an internal combustion engine of a vehicle in response to detecting a driver's engine stop operation, such as the operation of a brake pedal. These engine stop-and-start systems are also designed to restart the internal combustion engine in response to detecting a driver's operation to start the vehicle, such as the operation of an accelerator pedal. These engine stop-and-start systems aim at reducing fuel cost, exhaust emission, and the like.

In view of improvement of, for example, drivability, these engine stop-and-start systems are required to restart an internal combustion engine in immediate response to the occurrence of an engine restart request. Various technical approaches to achieve such a requirement have been proposed.

Japanese Examined Patent Publication No. 4211208 discloses a technical approach included in these various technical approaches. The technical approach disclosed in the Patent Publication is designed to, when an engine restart request occurs during the rotational speed of a crankshaft of an internal combustion engine (referred to as an engine) dropping, cause a starter to crank the engine without waiting the complete stop of rotation of the engine (crankshaft).

Specifically, the technical approach is designed to, when an engine restart request occurs during the rotational speed of the crankshaft of the engine dropping after automatic stop of the engine, rotate a pinion so that the rotational speed of the pinion is controlled to reach the rotational speed of a ring gear (engine) coupled to the output shaft of the engine. When the rotational speed of the pinion is synchronized with that of the ring gear, the technical approach engages the rotating pinion with the ring gear to thereby return the engine into operational status in immediate response to the occurrence of an engine restart request.

SUMMARY

Because the timing of the occurrence of an engine restart request during the engine speed dropping cannot be predicted, an engine restart request occurs within a low-speed range of the engine speed. In this case, the rotational speed of the pinion cannot be synchronized with the dropping engine speed. That is, the technical approach set forth above cannot properly carry out engagement of the pinion with the ring gear. Thus, when an engine restart request occurs during the engine speed dropping, an alternative approach is to engage the pinion of a starter with the ring gear first, and to drive the motor of the starter to rotate the pinion in response to the engagement of the pinion with the ring gear. This alternative approach is especially efficient when an engine restart request occurs within a low-speed range of the engine speed, such as 100 RPM or lower, during the engine speed dropping.

Note that, when the engine speed, which drops after automatic stop of the engine, reaches substantially zero after the piston in a cylinder passes the last TDC in the forward direction, the piston in the next cylinder in the firing order does not pass the next TDC so that the engine is rotated in the reverse direction. Thereafter, after the engine is alternately rotated in the forward direction and the reverse direction, the engine speed converges to zero.

Thus, if an engine restart request occurs with the engine speed close to zero, or the engine speed after automatic stop of the engine drops abruptly, the pinion may be engaged with the ring gear during reverse rotation of the output shaft of the engine. When the pinion is engaged with the ring gear during reverse rotation of the output shaft (ring gear) of the engine, if the alternative approach drives the motor to rotate the pinion in the forward direction, the difference in rotational direction between the pinion and the ring gear may cause various disadvantages in cranking the engine.

In view of the circumstances set forth above, one aspect of the present disclosure seeks to provide systems for cranking an internal combustion engine, which are designed to solve at least one of the disadvantages set forth above.

Specifically, an alternative aspect of the present disclosure aims to provide such systems for properly cranking an internal combustion engine when an engine restart request occurs during an engine speed dropping.

According to one aspect of the present disclosure, there is provided a system for cranking an automatically stopped internal combustion engine with an output shaft to which a ring gear is coupled using a starter comprising a pinion shiftable to and engageable with the ring gear, and a motor that rotates the pinion when energized. The system includes a predictor that predicts at least one future value of a rotational speed of the output shaft during drop of the rotational speed of the output shaft in a forward rotational direction due to automatic stop of the internal combustion engine. The system also includes an engaging unit that shifts, in response to when an engine restart condition is met during the drop of the rotational speed of the output shaft due to automatic stop of the internal combustion engine, the pinion to the ring gear for engaging the pinion with the ring gear. The system includes an engagement determiner that determines, based on the at least one future value of the rotational speed of the output shaft predicted by the predictor, whether the pinion and the ring gear will be shifted to engagement state therebetween during reverse rotation of the output shaft. The system includes a controller that controls, based on a result of the determination by the engagement determiner, at least one of: a start timing to shift the pinion to the ring gear by the engaging unit, and a start timing to energize the motor.

The one aspect of the present invention is configured to determine, based on the at least one future value of the rotational speed of the output shaft, whether the pinion and the ring gear will be shifted to engagement state therebetween during reverse rotation of the output shaft. Based on a result of the determination, the one aspect of the present invention is configured to control how to energize the motor. This configuration accurately determines the rotational direction of the output shaft when the pinion and the ring gear are shifted to their engagement state, and energize, at proper timing depending on the rotational state of the output shaft, the motor to turn the pinion.

Thus, it is possible to reduce disadvantages in cranking the internal combustion engine, such as an excessive increase in power consumption of the motor and/or wear of the tooth portion of the pinion and that of the ring gear due to collisions between the tooth portion of the pinion and that of the ring gear.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which:

FIG. 5 is a flowchart schematically illustrating operations of an ECU in accordance with a pinion post-rotation control routine stored in a storage unit according to the second embodiment.

DETAILED DESCRIPTION OF EMBODIMENT

Figure 1:
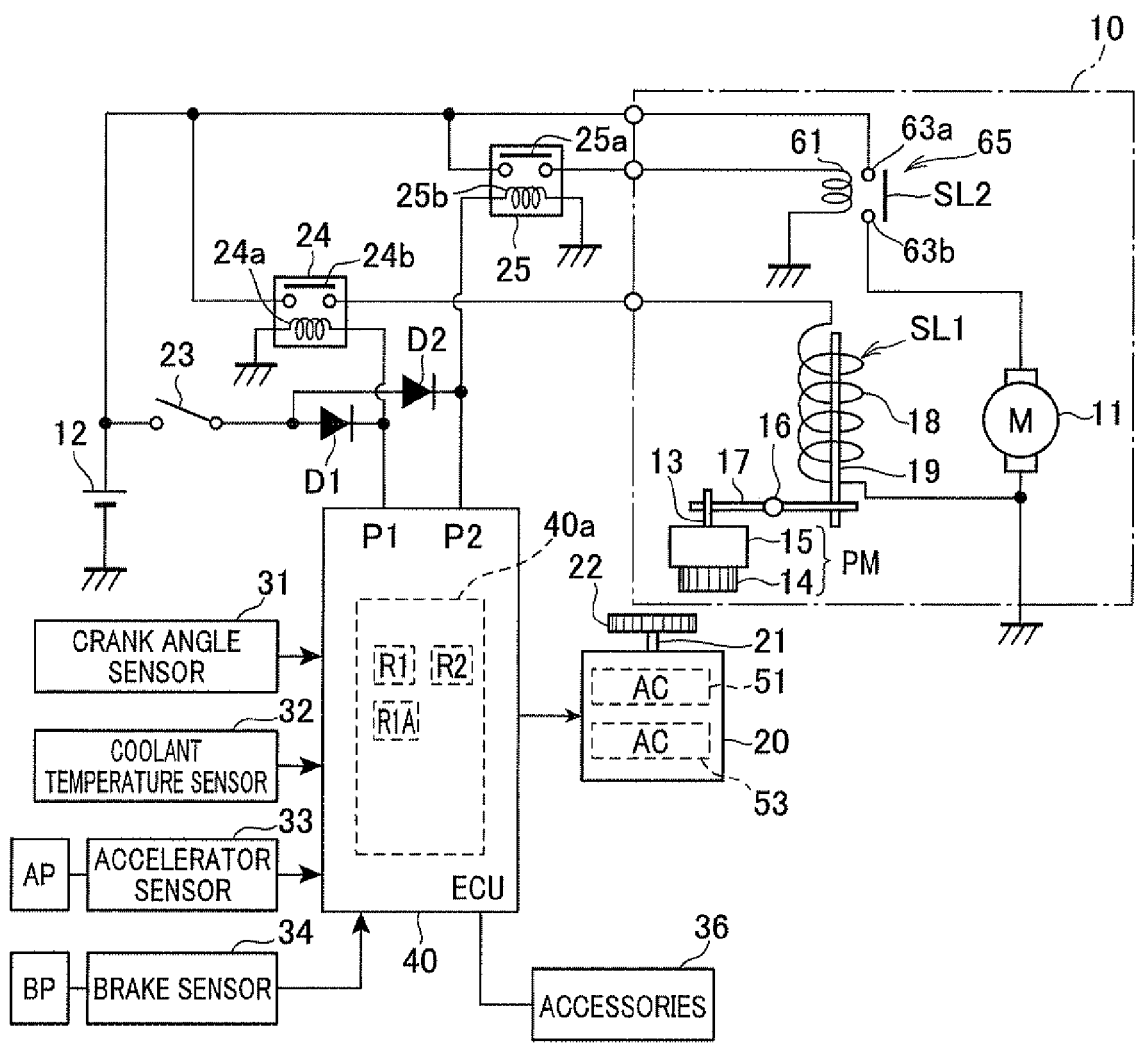
FIG. 1 is a view schematically illustrating an example of the overall hardware structure of an engine control system according to the first embodiment of the present disclosure.

Embodiments of the present disclosure will be described hereinafter with reference to the accompanying drawings. In the embodiments, like parts between the embodiments, to which like reference characters are assigned, are omitted or simplified in redundant description.

First Embodiment

In the first embodiment, the present disclosure includes an engine starting system designed as a part of an engine control system 1 installed in a motor vehicle.

The engine control system 1 is comprised of an electronic control unit (ECU) 40 as a central device thereof, and is operative to control the quantity of fuel to be sprayed and the timing of ignition, and carry out a task of automatically stopping an internal combustion engine (referred to simply as an engine) 20 and a task of restarting the engine 20. An example of the overall structure of the engine control system 1 is illustrated in FIG. 1. As the engine 20, a four-stroke, four-cylinder engine is employed in this embodiment as an example.

Referring to FIG. 1, the engine 20 has a crankshaft 21 as an output shaft thereof, with one end to which a ring gear 22 is directly or indirectly coupled. The crankshaft 21 is coupled to the piston via a connection rod within each cylinder such that travel of the piston in each cylinder up and down allows the crankshaft 21 to be turned.

Specifically, the engine 20 works to compress air-fuel mixture or air by the piston within each cylinder and burn the compressed air-fuel mixture or the mixture of the compressed air and fuel within each cylinder. This changes the fuel energy to mechanical energy, such as rotative energy, to reciprocate the piston within each cylinder, thus rotating the crankshaft 21. The rotation of the crankshaft 21 is transferred to driving wheels (not shown) of the motor vehicle through a powertrain (not shown) installed in the motor vehicle to thereby drive the motor vehicle.

The engine 20 is installed with, for example, a fuel injection system 51 and an ignition system 53.

The fuel injection system 51 includes actuators, such as fuel injectors, AC and causes the actuators AC to spray fuel either directly into each cylinder of the engine 20 or into an intake manifold (or intake port) just ahead of each cylinder thereof to thereby burn the air-fuel mixture in each cylinder of the engine 20.

The ignition system 53 includes actuators, such as igniters, AC and causes the actuators AC to provide an electric current or spark to ignite an air-fuel mixture in each cylinder of the engine 20, thus burning the air-fuel mixture.

When the engine 20 is designed as a diesel engine, the ignition system 53 can be eliminated.

Referring to FIG. 1, the engine control system 1 includes a starter 10, a chargeable battery 12, a first drive relay 24, a second drive relay 25, a first diode D1, and a second diode D2.

The starter 10 is comprised of a starter motor (motor) 11, a pinion shaft 13, a movable pinion member PM, a solenoid actuator SL1 including a solenoid 18, and a motor switch SL2.

The motor 11 is made up of an output shaft coupled to the pinion shaft 13, and an armature coupled to the output shaft and electrically connected to the motor switch SL2. The motor switch SL2 is comprised of a solenoid 61, a pair of stationary contacts 63a and 63b, and a movable contact 65. The stationary contact 63a is electrically connected to a positive terminal of the battery 12 whose negative terminal is grounded, and the stationary contact 63b is electrically connected to the armature of the motor 11.

The movable pinion member PM consists of a one-way clutch 15 and a pinion 14.

As illustrated in FIG. 1, the one-way clutch 15 is provided in helical spline engagement with an outer circumference of one end of the pinion shaft 13.

Specifically, the one-way clutch 15 is comprised of a clutch outer coupled to the one end of the pinion shaft 13 and a clutch inner on which the pinion 14 is mounted; these clutch inner and clutch outer are for example provided in helical spline engagement with each other.

The structure of the one-way clutch 15 allows the pinion 14 to be shiftable in the axial direction of the pinion shaft 13 together with the clutch inner of the one-way clutch 15 and rotatable therewith.

The one-way clutch 15 is designed to transfer rotational motion supplied from the motor 11 to the clutch inner (pinion 14) without transferring rotational motion supplied from the clutch inner (pinion 14) to the clutch outer (motor 11).

Specifically, even if the rotational speed of the crankshaft 21 of the engine 20 (ring gear 22) is higher than that of the pinion 14 during the pinion 14 being meshed with the ring gear 22, the one-way clutch 15 becomes disengaged so that the pinion 14 and the one-way clutch 15 is idle. This prevents the rotation of the ring gear 22 (pinion 14) from being transferred to the motor 11.

The motor 11 is arranged to be opposite to the engine 20 such that the shift of the pinion 14 in the axial direction of the pinion shaft 13 toward the engine 20 allows a tooth section of the pinion 14 to abut on a tooth section of the ring gear 22 of the engine 20 and to be meshed therewith.

The solenoid actuator SL1 is comprised of, for example, the solenoid 18, a plunger 19, a shift lever 17, and a pivot 16. The solenoid 18 is wound around the plunger 19. One end of the solenoid 18 is electrically connected to the positive terminal of the battery 12 via the first drive relay 24, and the other end thereof is grounded. The shift lever 17 has one end and the other end in its length direction. The one end of the shift lever 17 is pivotally coupled to one end of the plunger 19, and the other end of the shift lever 17 is coupled to the other end of the pinion shaft 13. The shift lever 17 is pivoted about the pivot 16 located at its substantially center in the length direction.

The first drive relay 24 is comprised of, for example, a solenoid 24a and a switch 24b. As the first drive relay 24, a semiconductor relay can be used. One end of the solenoid 24a is electrically connected to an output port P1 of the ECU 40 and to an ignition switch 23 through the first diode D1, and the other end is grounded. The ignition switch 23 is provided in the motor vehicle, and is electrically connected to the positive terminal of the battery 12.

When the ignition switch 23 is turned on by an operation of the driver, the battery 12 can supply electric power to the solenoid 24a via the first diode D1 as an engine starting signal so that the solenoid 24a is energized.

The switch 24b is electrically connected between the positive terminal of the battery 12 and the solenoid 18, the other end of which is grounded. The switch 24b is turned on (closed) by magnetic force generated when the solenoid 24a is energized so that the solenoid 18 is energized.

When energized, the solenoid 18 works to shift the plunger 19 thereinto in its length direction so as to pull it thereinto against the force of return spring (not shown). The pull-in shift of the plunger 19 pivots the shift lever 17 anticlockwise in FIG. 1 whereby the pinion shaft 13 is shifted to the ring gear 22 via the shift lever 17 together with the movable pinion member PM. This allows the pinion 14 of the movable pinion member PM to be meshed with the ring gear 22 for cranking the engine 21.

Otherwise, during the ignition switch 23 being in off, the solenoid 24a is deenergized so that the switch 24b is in off, resulting in that the solenoid 18 is deenergized.

When the solenoid 18 is deenergized, the return spring returns the plunger 19 and the shift lever 17 to their original positions illustrated in FIG. 1 so that the pinion 14 of the movable pinion member PM is pulled-out of mesh with the ring gear 22.

The second drive relay 25 is comprised of, for example, a solenoid 25a and a switch 25b. As the second drive relay 25, a semiconductor relay can be used.

One end of the solenoid 25a is electrically connected to an output port P2 of the ECU 40 and to the ignition switch 23 through the second diode D2, and the other end is grounded.

When the ignition switch 23 is turned on by an operation of the driver, the battery 12 can supply electric power to the solenoid 25a via the second diode D2, resulting in that the solenoid 25a is energized.

The switch 25b is electrically connected between the positive terminal of the battery 12 and one end of the solenoid 61 whose other end is grounded. The switch 25b is turned on (closed) by magnetic force generated when the solenoid 25a is energized so that the solenoid 61 is energized.

When the solenoid 61 is energized, the movable contact 65 is abutted onto the pair of stationary contacts 63a and 63b so that the armature of the motor 11 is energized by the battery 12. This causes the motor 11 to rotate the output shaft together with the pinion shaft 13, thus rotating the pinion 14 (movable pinion member PM).

Otherwise, during the ignition switch 23 being in off, the solenoid 25a is deenergized so that the switch 25b is off, resulting in that the solenoid 61 is deenergized. While the ignition switch 23 is off or is not positioned at the starter-ON position, the second drive relay 25 is in off state.

When deenergized, the movable contact 65 is separated from the pair of stationary contacts 63a and 63b so that the armature of the motor 11 is deenergized. This causes the motor 11 to stop the rotation of the output shaft and the pinion shaft 13, thus stopping the rotation of the pinion 14 (movable pinion member PM).

In addition, in the motor vehicle, for slowing down or stopping the vehicle, a brake actuator (not shown) is installed for each of wheels including the driving wheels.

Under control of the ECU 40 via a hydraulic circuit, in response to the driver's depression of a brake pedal BP, the brake actuator is designed to hydraulically apply a braking force to a corresponding wheel to thereby slow down or stop the rotation of a corresponding wheel.

In addition, the engine control system 1 includes, as means for measuring the operating conditions of the engine 20 and the driving conditions of the motor vehicle, various types of sensors. Specifically, the engine control system 1 includes a crank angle sensor 31, a coolant temperature sensor 32, an accelerator sensor 33, and a brake sensor 34.

The crank angle sensor 31 is operative to output, to the ECU 40, a rectangular NE signal (crank pulse) each time the crankshaft 21 is rotated by a preset angle, such as 30 degrees (30 crank-angle degrees).

The coolant temperature sensor 32 is operative to measure the temperature of an engine coolant inside the engine 20, and to output, to the ECU 40, a signal indicative of the measured temperature.

The accelerator sensor 33 is operative to:

measure a driver's operated (depressed) stroke of a driver-operable accelerator pedal AP of the motor vehicle linked to a throttle valve for controlling the amount of air entering the intake manifold; and output a signal indicative of the measured driver's operated stroke of the accelerator pedal AP to the ECU 40.

The brake sensor 34 is operative to:

measure a driver's operated (depressed) stroke of the brake pedal BP; and output, to the ECU 40, a signal indicative of the measured driver's operated stroke of the brake pedal BP.

Accessories 36 including an air conditioner for controlling the temperature and/or humidity within the cab of the motor vehicle and an alternator for charging the battery 12 are installed in the motor vehicle. The accessories 36 are electrically connected to the ECU 40 so that the ECU 40 can monitor the operating conditions of the accessories 36.

The ECU 40 is designed as, for example, a normal microcomputer circuit consisting of, for example, a CPU, a storage medium 40a including a ROM (Read Only Memory), such as a rewritable ROM, a RAM (Random Access Memory), and the like, an IO (Input and output) interface, and so on. The normal microcomputer circuit is defined in this embodiment to include at least a CPU and a main memory therefor.

The storage medium 40a stores therein beforehand various engine control programs.

The ECU 40 is operative to:
receive the signals outputted from the sensors 31 to 35; and
control, based on the operating conditions of the engine 20 deter mined by at least some of the received signals from the sensors, various actuators AC installed in the engine 20 to thereby adjust various controlled variables of the engine 20.

The ECU 40 is designed to carry out various engine control tasks.

For example, as the various engine control tasks, the ECU 40 is programmed to:
adjust a quantity of intake air into each cylinder;
compute a proper fuel injection timing and a proper injection quantity for the fuel injector AC for each cylinder and a proper ignition timing for the igniter AC for each cylinder;
instruct the fuel injector AC for each cylinder to spray, at a corresponding computed proper injection timing, a corresponding computed proper quantity of fuel into each cylinder; and
instruct the igniter AC for each cylinder to ignite the compressed air-fuel mixture or the mixture of the compressed air and fuel in each cylinder at a corresponding computed proper ignition timing.

In addition, the ECU 40 is designed to carry out various starter control tasks.

As described above, the ECU 40 has the output port P1 for outputting on/off signals to the first drive relay 24, and the output port P2 for outputting on/off signals to the second drive relay 25.

Specifically, when the on signal is sent from the ECU 40 via the output port P1, the solenoid 24a is energized so that the switch 24b is turned on. This automatically establishes, during the on signal being inputted thereto, electric conduction between the battery 12 and the solenoid 18 independently of the selected state of a starter switch (not shown). Similarly, when the on signal is sent from the ECU 40 via the output port P2, the solenoid 25a is energized so that the switch 25b is turned on. This automatically establishes, during the on signal being inputted thereto, electric conduction between the battery 12 and the armature of the motor 11 independently of the selected state of the starter switch.

In other words, the ECU 40 selects the on signal to be outputted to any one of the output ports P1 and P2, thus individually switching the energized state (mode) and the deenergized state (mode) of the solenoid 18, and individually switching the energized state (mode) and the deenergized state (mode) of the motor 11.

More specifically, when an electric signal, such as a pulse current with a pulse width (pulse duration) corresponding to the energization duration (on period) of the second drive relay 25, is sent from the ECU 40 to the second drive relay 25, the second drive relay 25 is turned on so that the motor 11 is energized based on the battery voltage of the battery 12.

The second drive relay 25 is turned off during off period of the pulse current so that the motor 11 is deenergized. A duty cycle of the motor 11 is represented as a ratio of the on period (pulse width) of the pulse current to the repetition interval (sum of the on and off periods) thereof. That is, the ECU 40 can adjust the on period (pulse width) of the pulse current to adjust the duty cycle of the motor 11 to thereby control the rotational speed of the motor 11, that is, the rotational speed of the pinion 14.

The ECU 40 is programmed to carry out engine automatic stop control and engine restart control in addition to main engine control.

Specifically, as the engine automatic stop control, the ECU 40 repetitively determines whether at least one of predetermined engine automatic stop conditions is met, in other words, whether an engine automatic stop request (idle reduction request) occurs based on the signals outputted from the sensors.

Upon determining that no predetermined engine automatic stop conditions are met, the ECU 40 exits the engine automatic stop control.

Otherwise, upon determining that at least one of the predetermined engine automatic stop conditions is met, that is, an automatic stop request occurs, the ECU 40 carries out an engine automatic stop task. Specifically, the ECU 40 controls the fuel injection system 51 to stop the supply of fuel (cut fuel) into each cylinder, and/or controls the ignition system 53 to stop the ignition of the air-fuel mixture in each cylinder, thus stopping the burning of the air-fuel mixture in each cylinder. The stop of the burning of the air-fuel mixture in each cylinder of the engine 20 means the automatic stop of the engine 20 (engine cut-off). For example, the ECU 40 according to this embodiment cuts fuel into each cylinder to thereby automatically stop the engine 20.

The predetermined engine automatic stop conditions include, for example, the following conditions that:
the driver's operated stroke of the accelerator pedal AP is zero (the driver completely releases the accelerator pedal AP) so that the throttle valve is positioned in its idle speed position;
the brake pedal BP is depressed by the driver; and
the rotational speed of the crankshaft 21 of the engine 20, referred to simply as an "engine speed", is equal to or lower than a preset speed (idle-reduction execution speed).

The automatic stop of the engine 20 causes the crankshaft 21 to coast, in other words, the engine speed in a forward direction to drop.

After the automatic stop of the engine 20, the ECU 40 carries out the engine restart control in response to when determining that at least one of predetermined engine restart conditions is met, that is, an engine restart request occurs, based on the signals outputted from the sensors. The predetermined engine restart conditions include, for example, the following conditions that:
the accelerator pedal AP is depressed (the throttle valve is opened) by the driver; and
the driver's operated stroke of the brake pedal BP is zero (the driver completely releases the brake pedal. BP).

Specifically, when at least one of the engine restart conditions is met during drop of the rotational speed of the engine 20 after automatic stop of the engine 20, the ECU 40 is programmed to drive the starter 10 to crank the engine 20 without waiting for the stop of rotation of the crankshaft 21.

For example, the ECU 40 is programmed to carry out a "motor post-drive mode (pinion post-rotation mode)" when a value of the rotational speed of the engine 20 at the meeting of at least one of the engine restart conditions is relatively low, for example, is close to 100 RPM or thereabout. In the pinion post-rotation mode, the ECU 40 drives the solenoid 18 to shift the pinion 14 to the ring gear 22 so that the pinion 14 is engaged with the ring gear 22, and thereafter, energizes the motor 11 to rotate the pinion 14 together with the ring gear 22, thus cranking the engine 20.

Figure 2:
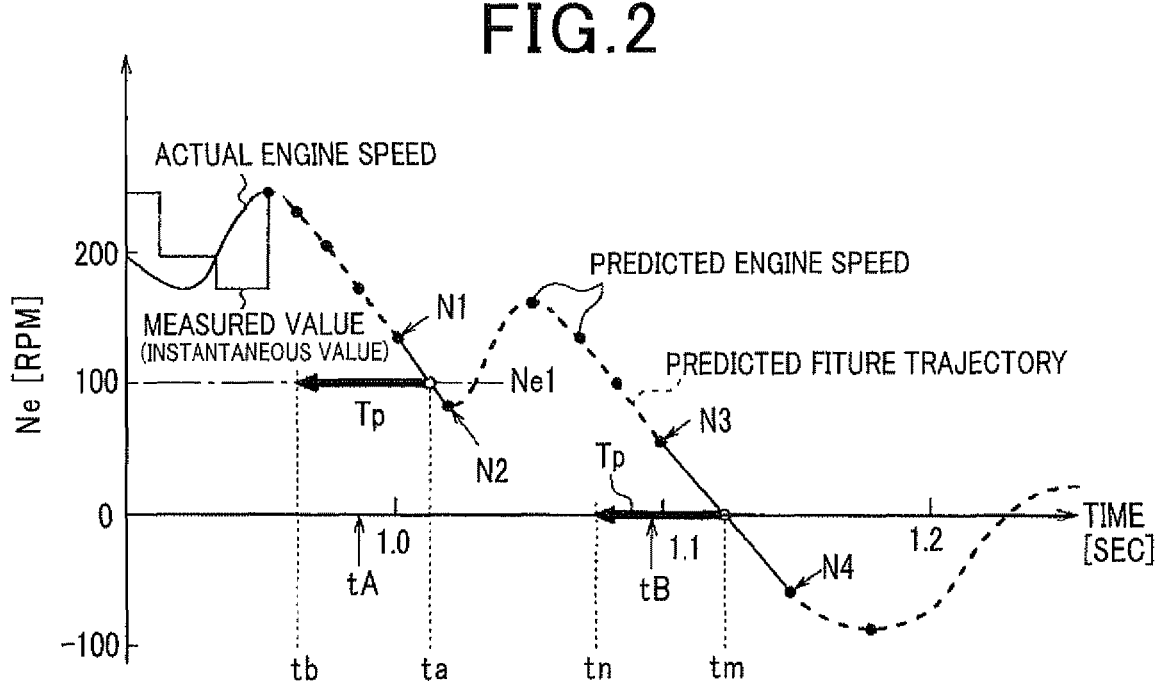
FIG. 2 is a timing chart schematically illustrating the variation in an engine speed during the engine-speed dropping after automatic stop of an internal combustion engine according to the first embodiment.

FIG. 2 is a timing chart used to describe operations of the ECU 40 in the pinion post-rotation mode. FIG. 2 schematically illustrates the variation in the engine-speed during the engine speed dropping after automatic stop of the engine 20.

As starter control during the engine speed dropping, the ECU 40 basically performs pinion post-rotation control only when the timing at which an engine restart condition is met allows engagement between the pinion 14 and the ring gear 22, more specifically, abutment of the outer periphery of the pinion 14 onto the outer periphery of the ring gear 22, before the engine speed exceeding a preset abutment allowable speed Ne1. The abutment allowable speed Ne1 is the upper limit of a range of the engine speed within which the outer periphery of the pinion 14 is allowed to abut onto the outer periphery of the ring gear 22. In the first embodiment, the abutment allowable speed Ne1 is set to 100 RPM or thereabout.

During the engine speed dropping, the ECU 40 predicts future values of the engine speed Ne at present time, and calculates, based on the predicted data of the future trajectory of drop of the engine speed, the timing ta at which the engine speed Ne reaches the abutment allowable speed Ne1. Then, the ECU 40 determines a post-rotation criterion point tb earlier than the timing ta by abutment required time Tp; the abutment required time Tp is time required for the outer periphery of the pinion 14 to have been in abutment with the outer periphery of the ring gear 22 since the start of shift of the pinion 14 to the ring gear 22. Thus, the ECU 40 performs the pinion post-rotation control only when an engine restart condition is met after the post-rotation criterion point tb.

Note that the fact that the outer periphery of the pinion 14 is in abutment with the outer periphery of the ring gear 22 means at least one gear of the pinion 14 is not engaged with a tooth space of the ring gear 22 but is in abutment with a tooth of the ring gear 22. In this case, the pinion 14 is rotated by an angle corresponding to an offset between the at least one gear of the pinion 14 and a tooth space of the ring gear 22; this tooth space is the closest to the at least one tooth of the pinion 14 in the rotational direction of the pinion 14. At the completion of the rotation of the pinion 14 by the angle corresponding to the offset, the shifting force of the pinion 14 to the ring gear 22 by the solenoid 18 allows the at least one tooth of the pinion 14 to be engaged with the tooth space of the ring gear 22 so that the pinion 14 is completely engaged with the ring gear 22. In the first embodiment, the abutment required time Tp corresponds to "engagement required time".

In the first embodiment, the ECU 40 predicts future instantaneous values of the engine speed Ne at present time using a loss torque (loss energy) T of the engine 20, previous instantaneous values of the engine speed Ne, and inertia (the moment of inertia) of the engine 20 as parameters. This prediction can predict the fluctuations of the engine speed due to increase and decrease in volume of the cylinders.

Specifically, in the first embodiment, one cycle of the fluctuations of the engine speed (instantaneous engine speed) due to increase and decrease in volume of the cylinders is referred to as a speed-fluctuation cycle. Because the engine 20 according to the first embodiment is a four-stroke, four-cylinder engine so that the engine 20 has a cylinder on a power stroke every 180 degrees of the rotation of the crankshaft 21, the speed-fluctuation cycle corresponds to 180 crank-angle degrees (CAD). For example, the crank angle of the crankshaft 21 is 0 degrees (0 crank angle degrees) relative to the reference position each time the piston in a cylinder is located at its top dead center (TDC).

That is, the ECU 40 predicts, based on instantaneous values of the engine speed during the previous speed-fluctuation cycle, instantaneous values of the engine speed during speed-fluctuation cycles after the previous speed-fluctuation cycle.

Figure 3:
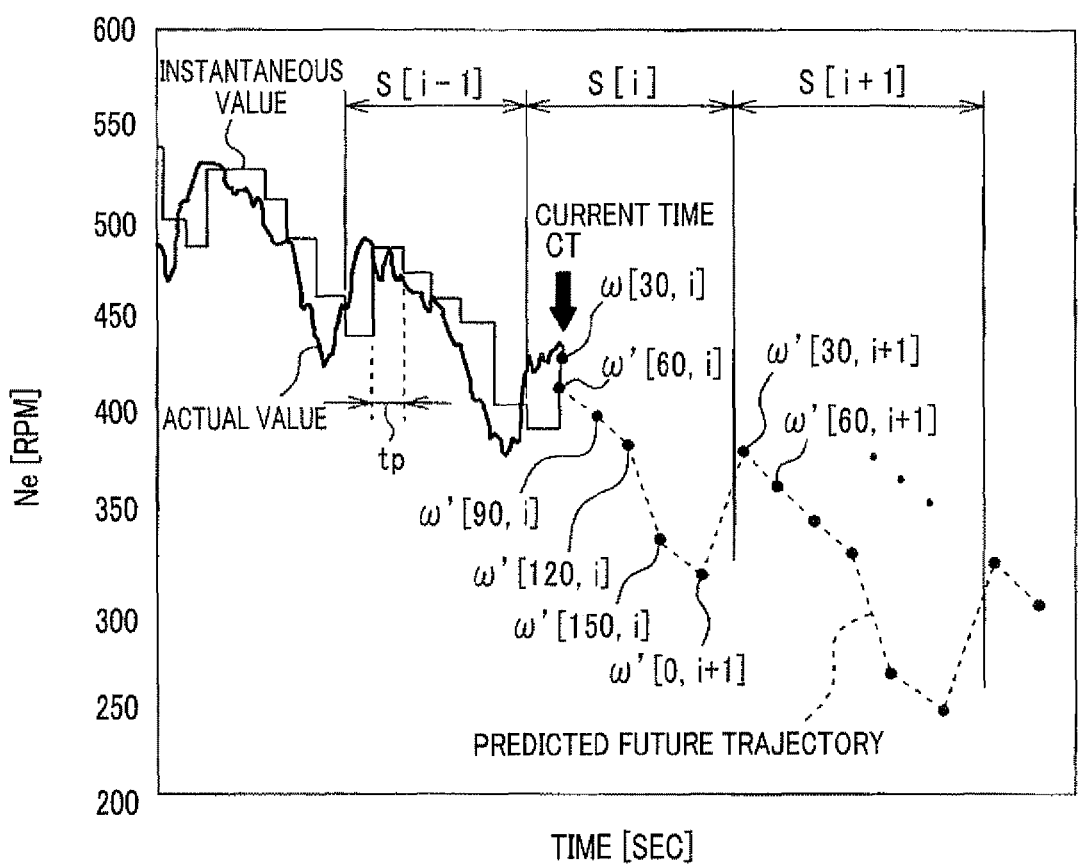
FIG. 3 is a view used to describe a method of predicting future instantaneous values of the engine according to the first embodiment.

FIG. 3 is a view used to describe a method of predicting future instantaneous values of the engine speed. Note that, in FIG. 3, S[i] is a parameter indicative of a present period of 180 crank-angle degrees (CAD) of the rotation of the crankshaft 22 from the current TDC of a cylinder to the next TDC of a cylinder. In addition, a current crank angle of the crankshaft 21 is 30 CAD past the current TDC, that is, 30 ATDC.

During the engine speed dropping after automatic stop (fuel cut-off) of the engine 20, the ECU 40 calculates an angular velocity ω of the crankshaft 21 as an instantaneous value of the engine 20 in accordance with the following equation (1) every time one crank pulse (an NE signal) is currently inputted to the ECU 40 from the crank angle sensor 31:

$$\omega [\text{rad/sec}] = \frac{30 \times 2\pi}{360 \times tp} \quad (1)$$

where tp represents the pulse interval [sec] of the NE signals.

Specifically, in the first embodiment, the ECU 40 computes a value of the angular velocity ω of the crankshaft 21 every rotation of the crankshaft 21 by 30 CAD during the engine speed dropping.

Based on a change of the angular velocity $\omega[\theta_n, i-1]$ at an angle $\theta_n$ CAD relative to the previous TDC within the precious 180 CAD period S[i−1], the ECU 40 calculates, for each angle $\theta_n$, the loss torque $T[\theta_n − \theta_{n+1}, i−1]$ from $\theta_{n+1}$ CAD−$\theta_n$ CAD within the previous 180 CAD period S[i−1] in accordance with the following equation (2):

$$T[\theta_n − \theta_{n+1}, i-1] = −J \cdot (\omega[\theta_{n+1}, i-1]^2 − \omega[\theta_n, i-1]^2)/2 \quad (2)$$

where J represents inertia (the moment of inertia) of the engine 20. The inertia J was previously calculated based on design data of the engine 20, and has been stored in the storage medium 40 of the ECU 40.

Note that the loss torque T (loss energy) means the change (reduction) of the rotational kinetic energy of the crankshaft 21 from a value of the angular velocity ω calculated by the ECU 40 to the next value of the angular velocity ω calculated by the ECU 40. That is, the loss torque T (loss energy means the loss of torque (energy) by the engine 20 during the engine 20 coasting after automatic stop of the engine 20. The loss torque T (loss energy) consists of, for example, the pumping loss torque (energy) and the friction loss torque (energy) of the engine 20, and the hydraulic loss torque (energy) of the transmission and an alternator and/or a compressor coupled to the crankshaft 21 via a belt or the like.

Next, the ECU 40 calculates the current value ω[30,i] of the angular velocity ω in accordance with the equation (1), and calculates a value T[0-30, i] of the loss torque T using the current value ω[30,i] and the previous value ω[0,i] of the angular velocity a) in accordance with the equation (2).

Thereafter, in order to calculate a predicted value of the angular velocity ω at the rising timing of the next crank-pulse, that is, at 60 CAD past the current TDC within the current 180 CAD period S[i], the ECU 40 extracts, in the values T[$\theta_n − \theta_{n+1}$, i−1] of the loss torque T within the precious 180 CAD period S[i−1], a value T[30-60,i−1] of the loss torque T. Then, the ECU 40 calculates, based on the extracted value T[30-60, i−1] of the loss torque T and the current value ω[30,i] of the angular velocity ω, the predicted value ω'[60,i] of the angular velocity ω in accordance with the following equation (3):

$$\omega'^2[60, i] = \omega^2[30, i] - \frac{2}{J}T[30-60, i-1] \qquad (3)$$

In addition, based on the predicted value ω'[60,i] of the angular velocity ω, the ECU 20 calculates a predicted value t[30-60,i] of arrival time at which the crankshaft 22 will arrive at 60 CAD relative to 30 CAD in accordance with the following equation [4]:

$$t[30-60, i] = \frac{2\pi \cdot 30}{360 \cdot \omega'[60, i]} = \frac{\pi}{6 \cdot \omega'[60, i]} \qquad [4]$$

Next, in order to calculate a predicted value of the angular velocity ω at the rising timing of the next crank-pulse, that is, at 90 CAD past the current TDC within the current 180 CAD period S[i], the ECU 40 extracts, in the values $T[\theta_n-\theta_{n+1},i-1]$ of the loss torque T within the precious 180 CAD period S[i−1], a value T[60-90,i−1] of the loss torque T. Then, the ECU 40 calculates, based on the extracted value T[60-90,i−1] of the loss torque T and the predicted value ω'[60,i] of the angular velocity ω, the predicted value ω'[90,i] of the angular velocity ω in accordance with the following equation (5):

$$\omega'^2[90, i] = \omega'^2[60, i] - \frac{2}{J}T[60-90, i-1] \qquad (5)$$

$$= \omega^2[30, i] - \frac{2}{J}(T[30-60, i-1] + T[60-90, i-1])$$

In addition, based on the predicted value ω'[90, i] of the angular velocity ω, the ECU 40 calculates a predicted value t[60-90,i] of arrival time at which the crankshaft 21 will arrive at 90 CAD relative to 60 CAD in accordance with the following equation [6]:

$$t[60-90, i] = \frac{2\pi \cdot 30}{360 \cdot \omega'[90, i]} = \frac{\pi}{6 \cdot \omega'[90, i]} \qquad [6]$$

That is, at current time (CT illustrated in FIG. 3), the ECU 40 repeats the calculation of the next predicted value of the angular velocity ω and the calculation of the next arrival time of the crankshaft 21 set forth above. This predicts what the angular velocity ω will be at intervals of 30 CAD of the rotation of the crankshaft 21, and what the arrival time will be at intervals of 30 CAD of the rotation of the crankshaft 21, thus predicting future instantaneous values (black circles in FIG. 3) of the engine speed during the engine-speed dropping. That is, it is possible to predict a future trajectory of the drop of the angular velocity of the crankshaft 21, in other words, the drop of the engine speed (see dashed lines connecting the black circles in FIG. 3). Data indicative of the predicted trajectory of the drop of the engine speed will be referred to as predicted data of the future trajectory of the drop of the engine speed, and the predicted data is stored in the storage medium 40*a*.

Specifically, each time a crank pulse is inputted to the ECU 40 from the crank angle sensor 31, the ECU 40 is programmed to carry out the predictions of the angular velocity ω and the arrival time set forth above to thereby update the previous predicted data of the future trajectory of the drop of the engine speed to currently obtained predicted data thereof within the time interval between the crank pulse and the next crank pulse that will be inputted to the ECU 40 from the crank angle sensor 31. Note that the ECU 40 can easily convert the instantaneous values of the angular velocity ω of the crankshaft 21 (engine 20) into corresponding instantaneous values of the engine speed, and can carry out the predictions of the instantaneous values of the engine speed and the arrival time in place of the instantaneous values of the angular velocity ω.

Note that the ECU 40 can convert each value of the arrival time of the crankshaft 21 into a corresponding elapsed time since a preset base point of time. For example, as the base point of time, the engine control system 1 according to the first embodiment has determined, for example, any one of: a first point of time representing the start of cutting fuel into the engine 20 (each cylinder); a second point of time when the engine speed drops up to a preset speed; a third point of time representing the start of predicting the future trajectory of the drop of the engine speed; and a fourth point of time representing the occurrence of an engine restart request.

The ECU 40 calculates the post-rotation criterion point tb based on the future trajectory of drop of the engine speed after automatic stop of the engine 20. Specifically, the ECU 40 extracts, from the predicted data of the future trajectory of drop of the engine speed, a predicted value (instantaneous value) N1 of the engine speed Ne immediately before the abutment allowable speed Ne1 and a predicted value (instantaneous value) N2 of the engine speed Ne immediately after the abutment allowable Ne1. Then, the ECU 40 carries out, for example, linear interpolation between the predicted values N1 and N2, and calculates, based on the linear interpolated future trajectory of drop of the engine speed Ne, a timing to at which a corresponding predicted value of the engine speed Ne is in agreement with the abutment allowable speed Ne1. Note that, if there are plural timings whose predicted values of the engine speed Ne are each in agreement with the abutment allowable speed Ne1, the ECU 40 can determine one of the plural timings, which is the earliest in the plural timings, as the timing ta.

Thereafter, the ECU 40 subtracts the abutment required time Tp from the time of the timing ta to thereby calculate the post-rotation criterion point tb.

Note that, when the engine speed, which drops after automatic stop of the engine 20, reaches substantially zero after the piston in a cylinder passes the last TDC in the forward direction, the piston in the next cylinder in the firing order does not pass the next TDC so that the rotational direction of the crankshaft 21 of the engine 20 is switched from the forward direction to the reverse direction. Thereafter, after the crankshaft 21 of the engine 20 is alternately rotated in the forward direction and the reverse direction, the engine speed converges to zero.

Because the ECU 40 cannot predict when an engine restart request occurs, if an engine restart request occurs with the engine speed close to zero, the pinion 14 may be engaged with the ring gear 22 during reverse rotation of the crankshaft 21 of the engine 20. In addition, the rate of drop of the engine speed varies for individual automatic stops of the engine 20 so that, for individual automatic stops of the engine 20, the timing at which the rotational direction of the crankshaft 21 is switched from the forward direction to the reverse direction varies depending on the variations in the rate of drop of the engine speed.

For these reasons set forth above, the pinion post-rotation control may cause the pinion 14 and the ring gear 22 being in disengagement state to be shifted to be in engagement state during reverse rotation of the crankshaft 21 of the engine 20 due to the timing of the occurrence of an engine restart request and/or the rate of drop of the engine speed. To describe it strictly, the pinion post-rotation control according to the first embodiment may cause the pinion 14 and the ring gear 22 in non-abutment state to be shifted to be in abutment state during reverse rotation of the crankshaft 21 of the engine 20 due to the timing of the occurrence of an engine restart request and/or the rate of drop of the engine speed.

If the motor 11 were driven during reverse rotation of the crankshaft 21 so that torque in the forward direction by the motor 11 were applied to the crankshaft 21 of the engine 20, there might be disadvantages, such as an excessive increase in power consumption of the motor 11 and/or wear of the tooth portion of the pinion 14 and that of the ring gear 22 due to collisions between the tooth portion of the pinion 14 and that of the ring gear 22.

Particularly, in the first embodiment, the one-way clutch 15 is provided between the pinion shaft 13 and the pinion 14 so that, during reverse rotation of the ring gear 22 (the crankshaft 21), the one-way clutch 15 is engaged to apply load in the reverse rotation to the motor 11, resulting in an increase of power consumption of the motor 11.

Thus, when an engine restart condition is met during drop of the rotational speed of the engine 20 after automatic stop of the engine 20 so that the pinion 14 is started to shift to the ring gear 22, the ECU 40 according to the first embodiment is designed to determine whether energization start timing of the motor 11 occurs during reverse rotation of the crankshaft 21 of the engine 20, and control how to energize the motor 20 based on a result of the determination.

Note that, in the first embodiment, because engagement of the pinion 14 with the ring gear 22 and start of rotation of the motor 11 are successively carried out, the fact that the shift of the pinion 14 and the ring gear 22 from their disengagement state to their engagement state occurs during reverse rotation of the crankshaft 21 is substantially equivalent to the fact that the energization start timing of the motor 11 occurs during reverse rotation of the crankshaft 21 of the engine 20.

The ECU 40 according to the first embodiment is designed to deter mine whether the energization start timing of the motor 11 occurs during reverse rotation of the crankshaft 21 of the engine 20 based on the future values of the future trajectory of drop of the engine speed.

Specifically, referring to FIG. 2, the ECU 40 calculates, based on the predicted data of the future trajectory of drop of the engine speed, the timing tm at which the engine speed Ne becomes zero first. Specifically, the ECU 40 extracts, from the predicted data of the future trajectory of drop of the engine speed, a predicted value (instantaneous value) N3 of the engine speed Ne immediately before the engine speed Ne arriving at zero and a predicted value (instantaneous value) N4 of the engine speed Ne immediately after the engine speed Ne falling below zero. Then, the ECU 40 carries out, for example, linear interpolation between the predicted values N3 and N4, and calculates, based on the linear interpolated future trajectory of drop of the engine speed Ne, the timing tm at which a corresponding predicted value of the engine speed Ne is zero.

Next, the ECU 40 determines the determination reference point tn earlier than the timing tm by the abutment required time Tp. That is, when an engine restart condition is met (pinion shift-start timing occurs) after the post-rotation criterion point tb and before the determination reference point tn, for example, at time point to illustrated in FIG. 2, the ECU 40 determines that the energization start timing of the motor 11 will occur during forward rotation of the crankshaft 21. According to the determination, after the lapse of the abutment required time Tp since start of shifting the pinion 14 (the output timing of the on signal to the first drive relay 24) at the occurrence of the pinion shift-start timing, the ECU 40 starts energization of the motor 11 subsequent to abutment (engagement) of the pinion 14 with the ring gear 22, thus cranking the engine 20.

In contrast, when an engine restart condition is met (pinion shift-start timing occurs) after the determination reference point tn, for example, at time point tB illustrated in FIG. 2, the ECU 40 determines that the energization start timing of the motor 11 will occur during reverse rotation of the crankshaft 21. According to the determination, after the lapse of preset time longer than the abutment required time Tp since start of shifting the pinion 14 at the occurrence of the pinion shift-start timing, that is, after the lapse of the preset time of the sum (Tp+α) of the abutment required time Tp and time α, the ECU 40 starts energization of the motor 11, thus cranking the engine 20. Note that the time α is set to be longer than a first reversion period during which the rotational direction of the crankshaft 21, which is reversed from the forward direction to the reverse direction first, is kept in the reverse direction. In other words, the first reversion period is a period from the start of the first reverse rotation of the crankshaft 21 to the return to the forward rotation of the crankshaft 21. As the time α, a preset period can be determined. The time α can also be determined by calculating, based on the future trajectory of drop of the engine speed, the length of the first reversion period, in other words, the time taken from the start of the first reverse rotation of the crankshaft 21 to the return to the forward rotation, and variably setting the time α based on the calculated length of the first reversion period.

Specifically, upon determining that the energization start timing of the motor 11 will occur during reverse rotation of the crankshaft 21, the ECU 40 delays the energization start timing of the motor 11, and energizes the motor 11 at the delayed energization start timing to thereby prevent rotation of the pinion 14 during reverse rotation of the crankshaft 21. This prevents excessive increase in power consumption of the motor 11, and reduces wear of the tooth portion of the pinion 14 and that of the ring gear 22 due to collisions between the tooth portion of the pinion 14 and that of the ring gear 22.

Figure 4:
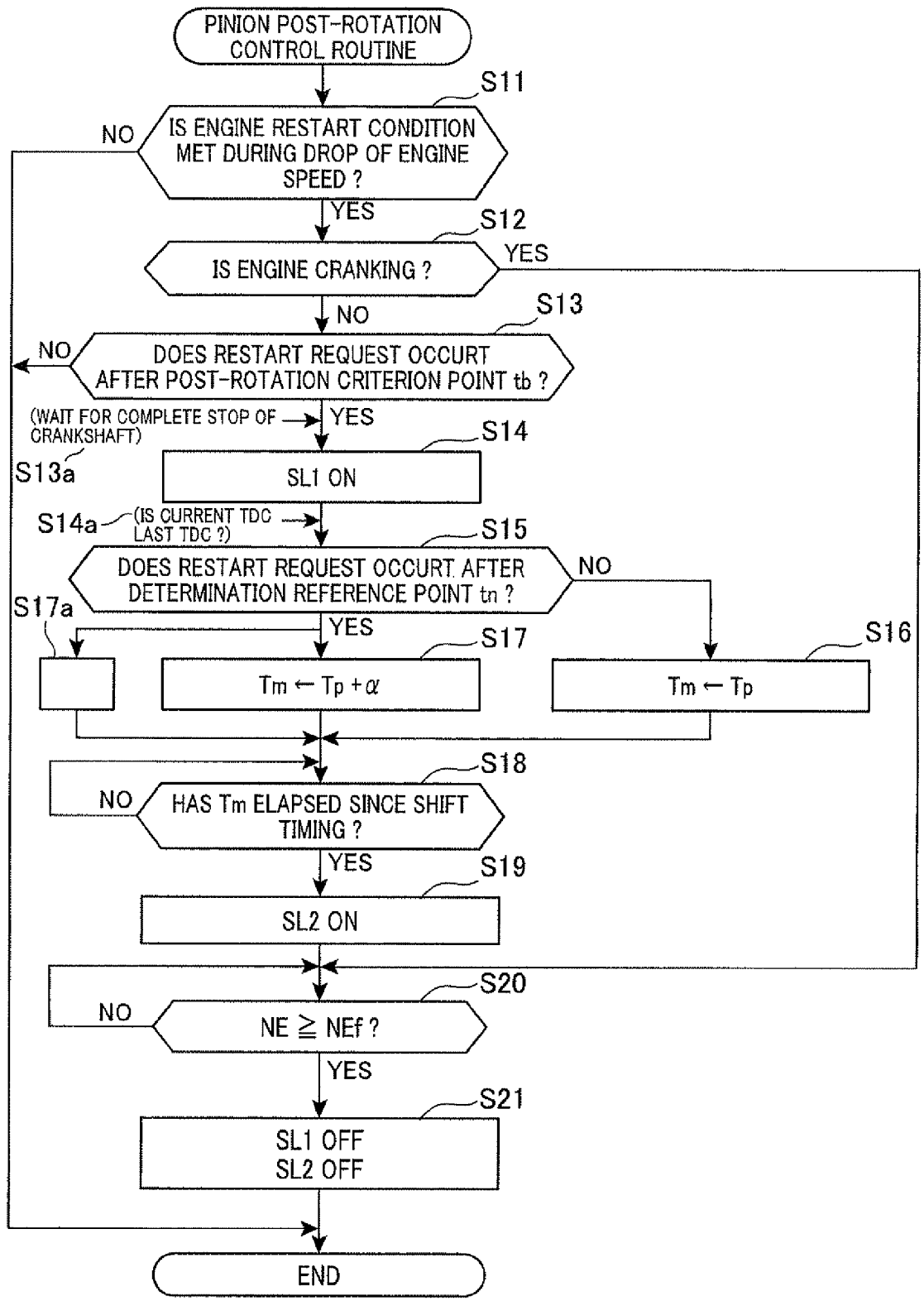
FIG. 4 is a flowchart schematically illustrating operations of an ECU in accordance with a pinion post-rotation control routine stored in a storage unit according to the first embodiment.

FIG. 4 schematically illustrates operations of the ECU 40 in accordance with a pinion post-rotation control routine R1 stored in the storage unit 40a according to the first embodiment. The ECU 40 repeatedly runs the pinion post-rotation control routine R1 in a preset cycle.

When launching the pinion post-rotation control routine R1, the ECU 40 determines whether an engine restart condition is met during the drop of the engine speed after automatic stop of the engine 20 in step S11. Upon determining that an engine restart condition is not met during drop of the engine speed after automatic stop of the engine 20 (NO in step S11), the ECU 40 terminates the pinion post-rotation control routine R1.

Otherwise, upon determining that an engine restart condition is met during drop of the engine speed after automatic stop of the engine 20 (YES in step S11), the ECU 40 proceeds to step S12. In step S12, the ECU 40 determines whether the starter 10 is cranking the engine 20. Upon deter mining that the starter 10 is not cranking the engine 20 (NO in step S12), the ECU 40 proceeds to step S13. In step S13, the ECU 40 determines whether the timing of the engine restart condition being met is after the post-rotation criterion point tb. As described above, the post-rotation criterion point tb is a threshold for determining whether to carry out the pinion post-rotation control, and calculated based on the future trajectory of drop of the engine speed after automatic stop of the engine 20, and the abutment required time Tp.

Upon determining that the timing of the engine restart condition being met is before the post-rotation criterion point tb (NO in step S13), the ECU 40 terminates the pinion post-rotation control routine R1. In this case, the ECU 40 performs a pinion pre-rotation control routine R2 stored in the storage medium 40a to thereby: energize the motor 11 to rotate the pinion 14 in response to the meeting of the engine restart condition, and shift the pinion 14 to the ring gear 22 to engage the pinion 14 with the ring gear 22 when the difference between the rotational speed of the tooth section of the ring gear 22 and that of the tooth section of the pinion 14 becomes equal to or lower than a preset threshold.

Otherwise, upon determining that the timing of the engine restart condition being met is after the post-rotation criterion point tb (YES in step S13), the ECU 40 sends the on signal to the first drive relay 24 to energize the solenoid 18 in step S14. The energized solenoid 18 pulls the plunger 19 thereinto against the force of return spring, and the pull-in shift of the plunger 19 pivots the shift lever 17 anticlockwise in FIG. 1, thus starting shift of the pinion 14 to the ring gear 22.

After completion of the operation in step S14, the ECU 40 determines whether the timing of the engine restart condition being met is after the determination reference point tn in step S15. As described above, the determination reference point tn is a threshold for determining whether the pinion 14 and the ring gear 22 will be shifted from their disengagement state to their engagement state during reverse rotation of the crankshaft 21, that is, whether the energization start timing of the motor 11 will occur during reverse rotation of the crankshaft 21. The determination reference point tn is calculated based on the future trajectory of drop of the engine speed after automatic stop of the engine 20, and the abutment required time Tp.

Upon determining that the timing of the engine restart condition being met will be before the determination reference point tn (NO in step S15), that is, the pinion 14 and the ring gear 22 will be shifted from their disengagement state to their engagement state during forward rotation of the crankshaft 21, the ECU 40 proceeds to step S16. In step S16, the ECU 40 determines, as motor wait time Tm, the abutment required time Tp; the motor wait time Tm is time taken from the output timing of the on signal to the first drive relay 24 to the start of energization of the motor 11.

Otherwise, upon determining that the timing of the engine restart condition being met will be after the determination reference point tn (YES in step S15), that is, the pinion 14 and the ring gear 22 will be shifted from their disengagement state to their engagement state during reverse rotation of the crankshaft 21, the ECU 40 proceeds to step S17. In step S17, the ECU 40 determines, as the motor wait time Tm, time longer than the abutment required time Tp, that is, determines, as the motor wait time Tm, the sum (Tp+α) of the abutment required time Tp and the preset time α.

Next, the ECU 40 determines whether the motor wait time Tm has elapsed since the output timing of the on signal to the first drive relay 24 in step S18. As long as the motor wait time Tm has elapsed since the output timing of the on signal to the first drive relay 24 (YES in step S18), the ECU 40 proceeds to step S19, and outputs the on signal to the second drive relay 25 to thereby energize the motor 11 in step S19. The energization of the motor 11 turns the pinion 14 with the pinion 14 and the ring gear 22 being engaged with each other, thus cranking the engine 20.

Next, the ECU 40 determines whether the engine speed Ne is equal to or higher than a preset engine-starting speed Nef, such as a value within a range from 400 to 500 RPM in step S20; the engine-starting speed Nef is set beforehand to be higher than the upper limit of a cranking rotational-speed range previously determined for the rotational speed of the motor 11. That is, while the rotational speed of the motor 11 is within the cranking rotational-speed range, it is possible to transfer torque from the pinion 14 to the ring gear 22 at cranking of the engine 20.

As long as the engine speed Ne is equal to or higher than the preset engine-starting speed Nef (YES in step S20), the ECU 40 proceeds to step S21, and outputs, to each of the first and second drive relays 24 and 25, the off signal, thus turning off the first and second drive relays 24 and 25 in step S21. The turnoff the first and second drive relays 24 and 25 disengages the pinion 14 with the ring gear 22 by the return spring, and stops the motor 11 in rotation. This terminates cranking the engine 20.

As described above, the engine control system 1 according to the first embodiment is configured to, when starting shift of the pinion 14 to the ring gear 22 in response to the meeting of an engine restart condition during drop of the engine speed after automatic stop of the engine 20, determine, based on the future trajectory of drop of the engine speed, whether the pinion 14 and the ring gear 22 will be shifted from their disengagement state to their engagement state during reverse rotation of the crankshaft 21, that is, whether the energization start timing of the motor 11 will occur during reverse rotation of the crankshaft 21. Based on a result of the determination, the ECU 40 is configured to control how to energize the motor 11. This configuration accurately determines the rotational direction of the crankshaft 21 when the pinion 14 and the ring gear 22 are shifted from their disengagement state to their engagement state, and energize, at proper timing depending on the rotational state of the crankshaft 21, the motor 11 to turn the pinion 14.

Thus, it is possible to reduce disadvantages in cranking the engine 20, such as an excessive increase in power consumption of the motor 11 and/or wear of the tooth portion of the pinion 14 and that of the ring gear 22 due to collisions between the tooth portion of the pinion 14 and that of the ring gear 22.

The engine control system 1 according to the first embodiment is configured to, when it is determined that the pinion 14 and the ring gear 22 will be shifted from their disengagement state to their engagement state during reverse rotation of the motor 11, wait for the lapse of the first reversion period during drop of the engine speed, and thereafter energize the motor 11. This configuration prevents drive of the motor 11 during the first reversion period in which the rate of reverse rotation of the crankshaft 21 is the largest in all of the reversion periods, thus restarting the engine 20 as early as possible while reducing these disadvantages, such as an excessive increase in power consumption of the motor 11.

The engine control system 1 according to the first embodiment is configured to:
successively carry out engagement of the pinion 14 with the ring gear 22 and rotation of the pinion 14 if it is determined that the pinion 14 and the ring gear 22 will be shifted from its disengagement state to its engagement state during forward rotation of the crankshaft 21; and
non-successively carry out engagement of the pinion 14 with the ring gear 22 and rotation of the pinion 14 if it is determined that the pinion 14 and the ring gear 22 will be shifted from its disengagement state to its engagement state during reverse rotation of the crankshaft 21.

This configuration maintains a proper balance between early restart of the engine 20 and reduction in power consumption of the motor 11.

Second Embodiment

An engine control system according to the second embodiment of the present invention will be described hereinafter with reference to FIG. 5.

The structure and/or functions of the engine control system according to the second embodiment are different from the engine control system 1 by the following points. So, the different points will be mainly described hereinafter.

The engine control system 1 according to the first embodiment is configured to non-successively carry out engagement of the pinion 14 with the ring gear 22 and rotation of the pinion 14 if it is determined that the pinion 14 and the ring gear 22 will be shifted from its disengagement state to its engagement state during reverse rotation of the crankshaft 21, thus preventing drive of the motor 11 during reverse rotation of the crankshaft 21.

In contrast, the engine control system according to the second embodiment is configured to, even if it is determined that the pinion 14 and the ring gear 22 will be shifted from its disengagement state to its engagement state during reverse rotation of the crankshaft 21, successively carry out engagement of the pinion 14 with the ring gear 22 and rotation of the pinion 14 if it is determined that the pinion 14 and the ring gear 22 will be shifted from its disengagement state to its engagement state while preventing the rotation of the motor 11 during reverse rotation of the crankshaft 21.

FIG. 5 schematically illustrates operations of the ECU 40 in accordance with a pinion post-rotation control routine R1A stored in the storage unit 40a according to the second embodiment. The ECU 40 repeatedly runs the pinion post-rotation control routine R1A in a preset cycle. In the pinion post-rotation control routines R1 and R1A, like operations between the routines R1 and R1A, to which like step numbers are assigned, are omitted or simplified in redundant description.

When launching the pinion post-rotation control routine R1A, the ECU 40 performs the operations in step S31 to S33 equivalent to those in step S11 to S13. Upon determining that the timing of the engine restart condition being met is after the post-rotation criterion point tb (YES in step S13), the ECU 40 proceeds to step S34, and determines whether the timing of the engine restart condition being met is after the determination reference point tn in step S34, which is equivalent to the determination in step S15.

Upon determining that the timing of the engine restart condition being met will be before the determination reference point tn (NO in step S34), that is, the pinion 14 and the ring gear 22 will be shifted from their disengagement state to their engagement state during forward rotation of the crankshaft 21, the ECU 40 proceeds to step S35. In step S35, the ECU 40 sets, to zero, shift delay time Tn that is time taken from the timing of the engine restart condition being met to the start of shifting of the pinion 14.

Otherwise, upon determining that the timing of the engine restart condition being met will be after the determination reference point tn (YES in step S34), that is, the pinion 14 and the ring gear 22 will be shifted from their disengagement state to their engagement state during reverse rotation of the crankshaft 21, the ECU 40 proceeds to step S36.

In step S36, the ECU 40 calculates the rate $\Delta NE$ of reverse rotation of the crankshaft 21, and determines whether the rate $\Delta NE$ of reverse rotation of the crankshaft 21 is equal to or higher than a preset threshold $\Delta TH1$ of, for example, 200 RPM. Note that the rate $\Delta NE$ of reverse rotation of the crankshaft 21 is a peak value (absolute value) of the engine speed that is within the first reversion period during drop of the engine speed. For example, in step S36, the ECU 40 can calculate the rate $\Delta NE$ of reverse rotation of the crankshaft 21 based on the future trajectory of drop of the engine speed, the rate of drop of the engine speed, and/or rotational energy of the engine 20.

Upon determining that the rate $\Delta NE$ of reverse rotation of the crankshaft 21 is lower than the preset threshold $\Delta TH1$ (NO in step S36), the ECU 40 proceeds to step S35, and sets the shift delay time Tn to zero in step S35.

Otherwise, upon determining that the rate $\Delta NE$ of reverse rotation of the crankshaft 21 is equal to or higher than the preset threshold $\Delta TH1$ (YES in step S36), the ECU 40 proceeds to step S37, and sets the shift delay time Tn to preset positive time $\beta$ in step S37. In the second embodiment, the time $\beta$ is determined to be shorter, by the abutment required time Tp, than the length of the first reversion period, in other words, the time taken from the start of the first reverse rotation of the crankshaft 21 to the return to the forward rotation. As the time $\beta$, a preset period can be determined. The time $\beta$ can also be determined by calculating, based on the future trajectory of drop of the engine speed, the length of the first reversion period, in other words, the time taken from the start of the first reverse rotation of the crankshaft 21 to the return to the forward rotation, and variably setting the time $\beta$ based on the calculated length of the first reversion period.

Why to variably set the time $\beta$ based on the calculated length of the first reversion period is the following reasons.

Specifically, in all of the reversion periods, if there is at least one reversion period in which the engine speed becomes equal to or lower than −200 RPM, the difference in rotational-speed between the pinion 14 and the ring gear 22 is large with the engine speed being within the at least one reversion period. Thus, engagement of the pinion 14 with the ring gear 22 with the engine speed being within the at least one reversion period may increase noise due to the engagement. However, in all of the reversion periods, if there is at least one reversion period in which the engine speed is close to zero, the difference in rotational-speed between the pinion 14 and the ring gear 22 is small with the engine speed being within the at least one reversion period. Thus, engagement of the pinion 14 with the ring gear 22 with the engine speed being within the at least one reversion period can maintain at a low level noise due to the engagement, and therefore, can reduce the disadvantages due to the engagement of the pinion 14 with the ring gear 22.

Thus, the ECU 40 according to the second embodiment is programmed to determine, even if the pinion 14 and the ring gear 22 are shifted from their disengagement state to their engagement state during reverse rotation of the crankshaft 21, the timing of meeting an engine restart condition as the pinion shift-start timing as long as the rate of reverse rotation of the crankshaft 21 is lower than the preset threshold $\Delta TH1$. This makes it possible to restart the engine 20 in higher response to the timing of the engine restart request meeting.

In contrast, if the pinion 14 and the ring gear 22 are shifted from their disengagement state to their engagement state during reverse rotation of the crankshaft 21 with the rate $\Delta NE$ of reverse rotation of the crankshaft 21 being equal to or higher than the preset threshold $\Delta TH1$, the ECU 40 is programmed to delay the pinion shift-start timing relative to the timing of the engine restart condition being met, thus shifting engagement timing of the pinion 14 with the ring gear 22 after the lapse of the first reversion period during drop of the engine speed.

After completion of each of the operations in steps S35 and S37, the ECU 40 proceeds to step S38, and determines whether the shift delay time Tn has elapsed since the timing of the engine restart request being met in step S38. As long as the shift delay time Tn has elapsed since the timing of the engine restart request being met (YES in step S38), the ECU 40 proceeds to step S39, and sends the on signal to the first drive relay 24 to energize the solenoid 18 in step S39. The energized solenoid 18 pulls the plunger 19 thereinto against the force of return spring, and the pull-in shift of the plunger 19 pivots the shift lever 17 anticlockwise in FIG. 1, thus starting shift of the pinion 14 to the ring gear 22.

Next, the ECU 40 determines whether the abutment required time Tp has elapsed since the output timing of the on signal to the first drive relay 24 in step S40. As long as the abutment required time Tp has elapsed since the output timing of the on signal to the first drive relay 24 (YES in step S40), the ECU 40 proceeds to step S41, and outputs the on signal to the second drive relay 25 to thereby energize the motor 11 in step S41. The energization of the motor 11 turns the pinion 14 with the pinion 14 and the ring gear 22 being engaged with each other, thus cranking the engine 20.

Thereafter, the ECU 40 performs the operations in steps S42 and S43, which are equivalent to those in steps S20 and S21, and thereafter, terminates the pinion post-rotation control routine R1A.

As described above, the engine control system according to the second embodiment, which is previously designed to start rotation of the motor 11 after the lapse of the abutment required time Tp since the start of shifting the pinion 14, is configured to, when determining that the pinion 14 and the ring gear 22 will be shifted from their disengagement state to their engagement state during reverse rotation of the crankshaft 21, control the timing of shifting the pinion 14 to the ring gear 22 such that the start timing of rotation of the motor 11 is properly adjusted. That is, the configuration turns the pinion 14 at proper timing depending on the rotational state of the crankshaft 21. Thus, it is possible to reduce disadvantages in cranking the engine 20, such as an excessive increase in power consumption of the motor 11 and/or wear of the tooth portion of the pinion 14 and that of the ring gear 22 due to collisions between the tooth portion of the pinion 14 and that of the ring gear 22.

Note that, in each of the first and second embodiments, "the pinion 14 and the ring gear 22 in engagement state therebetween includes, in addition to an initial state in which at least a part of the tooth portion of the pinion 14 is in abutment with at least a part of the tooth portion of the ring gear 22, an intermediate state in which at least a part of the tooth portion of the pinion 14 is engaged with at least a part of the tooth portion of the ring gear 22, and includes a final state in which the tooth portion of the pinion 14 is completely engaged with the tooth section of the ring gear 22.

The present disclosure is not limited to the descriptions of the first and second embodiments, and it can be modified as follows.

The engine control system according to each of the first and second embodiments can be configured to:

determine, during drop of the engine speed after automatic stop of the engine 20, whether the current TDC corresponds to the last TDC during forward rotation of the crankshaft 21 in step S14a illustrated in FIG. 4; and if it is determined that the current TDC corresponds to the last TDC during forward rotation of the crankshaft 21, determine, based on the determination reference point tn, whether the pinion 14 and the ring gear 22 will be shifted from their disengagement state to their engagement state during reverse rotation of the crankshaft 21 in step S15.

Specifically, after the piston in a cylinder passes the last TDC in the forward direction, the piston in the next cylinder in the firing order does not pass the next TDC, the crankshaft 21 is rotated in the reverse direction.

Thus, the modification can determine whether the pinion 14 and the ring gear 22 will be shifted from their disengagement state to their engagement state during reverse rotation of the crankshaft 21 under circumstances where the crankshaft 21 is likely reversed from forward rotation to reverse rotation.

In this modification, the ECU 40 determines whether the current TDC corresponds to the last TDC during forward rotation of the crankshaft 21 based on the future trajectory of drop of the engine speed. Specifically, when determining that a value of the engine speed (angular velocity ω) at the timing of the next TDC is a negative value, the ECU 40 can determines that the current timing corresponding to the current TDC is the last TDC during forward rotation of the crankshaft 21.

In the first embodiment, when determining that the pinion 14 and the ring gear 22 will be shifted from their disengagement state to their engagement state during reverse rotation of the crankshaft 21 (YES in step S15), the ECU 40 can start energization of the motor 11 within the first revision period as long as the engine speed has exceeded the negative peak value in step S17a. This modification can prevent drive of the motor 11 during an increase in rotational energy of the engine 20, and therefore can start cranking the engine 20 as early as possible while preventing an excessive increase in power consumption of the motor 11.

In the first embodiment, as well as the second embodiment, the ECU 40 can calculate the rate ΔNE of reverse rotation of the crankshaft 21 (see step S36), and determine, based on the rate ΔNE of reverse rotation of the crankshaft 21, the energization start timing of the motor 11 at which the pinion 14 and the ring gear 22 will be shifted from their disengagement state to their engagement state during reverse rotation of the crankshaft 21 (step S16 or step S17).

In this modification, if the rate ΔNE of reverse rotation of the crankshaft 21 is equal to or lower than a preset threshold, for example, the threshold TH1 (YES in step S36), the ECU 40 can determine, as the energization start timing of the motor 20, timing after the lapse of the abutment required time Tp since the turning on of the first drive relay 24 as long as the rate ΔNE of reverse rotation of the crankshaft 21 is equal to or lower than the preset threshold (see step S16) even if it is determined that the pinion 14 and the ring gear 22 will be shifted from their disengagement state to their engagement state during reverse rotation of the crankshaft 21 (YES in step S15). This is because even if it is determined that the pinion 14 and the ring gear 22 will be shifted from their disengagement state to their engagement state during reverse rotation of the crankshaft 21, there can be a low impact of an excessive increase in power consumption of the motor 11 as long as the rate ΔNE of reverse rotation of the crankshaft 21 is equal to or lower than the preset threshold. Thus, this modification can maintain a proper balance between early restart of the engine 20 and reduction in power consumption of the motor 11.

In each of the first and second embodiments, the ECU 40 can determine, based on the rate ΔNE of reverse rotation of the crankshaft 21 (see step S36), the motor wait time Tm taken from the output timing of the on signal to the first drive relay 24 to the start of energization of the motor 11 (see step S17 or S16), or the shift delay time Tn taken from the timing of the engine restart condition being met to the start of shifting of the pinion 14 (see step S35 or step S37). For example, the ECU 40 can increase either the motor wait time Tm or the shift delay time Tn with increase in the rate ΔNE of reverse rotation of the crankshaft 21.

In the second embodiment, upon determining that the pinion 14 and the ring gear 22 will be shifted from their disengagement state to their engagement state during reverse rotation of the crankshaft 21 (YES in step S34), the ECU 40 can delay the pinion shift-start timing relative to the timing of the engine restart condition being met (see step S37) independently of whether the rate ΔNE of reverse rotation of the crankshaft 21 being equal to or higher than the preset threshold ΔTH1. This modification prevents engagement of the pinion 14 with the ring gear 22 during reverse rotation of the crankshaft 21, thus preventing engagement of the pinion 14 with the ring gear 22 with the rate NE of reverse rotation of the crankshaft 21 being high.

In each of the first and second embodiments, upon determining that the pinion 14 and the ring gear 22 will be shifted from their disengagement state to their engagement state during reverse rotation of the crankshaft 21 (YES in step S14 or S34), the ECU 40 can wait for complete stop of rotation of the crankshaft 21, and thereafter shift the pinion 14 to the ring gear 22 to engage the pinion 14 with the ring gear 22 (step S13a illustrated in FIG. 4). After engagement of the pinion 14 with the ring gear 22, the ECU 40 can drive the motor 11 to rotate the pinion 14 with the pinion 14 being engaged with the ring gear 22 (step S13a illustrated in FIG. 4). This modification prevents drive of the motor 11 during not only the first reversion period during drop of the engine speed but also the following reverse period(s).

The ECU 40 according to each of the first and second embodiments can carry out another method of predicting the future trajectory of drop of the engine speed. For example, the ECU 40 can predict the future trajectory of drop of the engine speed based on measured values of the engine speed. For example, the ECU 40 can calculate a set of continuous values of the angular velocity ω as instantaneous values thereof, and predict a monotonic decreasing trajectory without fluctuations using the set of continuous values of the angular velocity ω, thus predicting the future trajectory of drop of the engine speed. For example, fitting a function passing through the set of continuous values of the angular velocity ω can predict the future trajectory of drop of the engine speed.

The ECU 40 can calculate each of the post-rotation criterion point tb and the determination reference point to in light of: the abutment required time Tp, and time γ taken from abutment of the pinion 14 with the ring gear 22 to completion of engagement of the pinion 14 with the ring gear 22. In this modification, the sum of the abutment required time Tp and the time γ corresponds to the engagement required time. Thus, in each of the routines R1 and R1A, the abutment required time Tp can be replaced with the engagement required time. In this modification, the pinion 14 and the ring gear 22 in their engagement state is that the tooth portion of the pinion 14 is engaged with that of the ring gear 22.

In each of the first and second embodiments, the present invention is applied to the corresponding engine control system 1 equipped with the starter 10 including the first and second drive relays 24 and 25 and designed to individually drive the pinion actuator 18 and the motor 11, but the present invention is not limited to the application.

Specifically, the present invention can be applied to an engine control system equipped with a starter designed to independently carry out disengagement of the pinion 14 with the ring gear 22, and stop of rotation of the motor 11. For example, a normal starter with a motor-control relay for control of energization and deenergization of a motor can be applied as a starter of the present invention. That is, in this modification, in place of the motor switch SL2 of the starter 10 illustrated in FIG. 1, a contact is provided at the other end of the plunger 19 opposite to the one end coupled to the lever 17; this contact is used for energizing the motor 11. In addition, in this modification, the motor-control relay can be provided between the motor 11 and the battery 12; this relay can be switched off and on according to control signals supplied from the ECU 40. The configuration of the modification can individually control the first drive relay and the motor-control relay, thus independently control engagement of the pinion 14 with the ring gear 22 and rotation of the motor 11.

The present invention can be applied to motor vehicles each with a diesel engine.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A system for cranking an automatically stopped internal combustion engine with an output shaft to which a ring gear is coupled using a starter comprising a pinion shiftable to and engageable with the ring gear, and a motor that rotates the pinion when energized, the system comprising:
   an engaging unit that shifts, in response to when an engine restart condition is met during a drop of a rotational speed of the output shaft due to an automatic stop of the internal combustion engine, the pinion to the ring gear for engaging the pinion with the ring gear;
   an electronic control unit operably coupled with the engaging unit and the motor, the electronic control unit being configured to:
   (i) predict at least one future value of the rotational speed of the output shaft during the drop of the rotational speed of the output shaft in a forward rotational direction due to the automatic stop of the internal combustion engine;
   (ii) determine, based on the predicted at least one future value of the rotational speed of the output shaft, whether the pinion and the ring gear will be shifted to an engagement state therebetween during reverse rotation of the output shaft; and
   (iii) control, based on a result of the determination of whether the pinion and the ring gear will be shifted to an engagement state therebetween during reverse rotation of the output shaft, at least one of: (a) a start timing to shift the pinion to the ring gear by the engaging unit, and (b) a start timing to energize the motor.

2. The system according to claim 1, wherein, after the rotational speed of the output shaft reaches substantially zero, the output shaft of the internal combustion engine is rotated first in a reverse rotational direction during a first reversion period, and thereafter, is alternately rotated in the forward rotational direction and the reverse rotational direction, and the electronic control unit is configured to, when it is determined that the pinion and the ring gear will be shifted to the engagement state therebetween during reverse rotation of the output shaft, start energization of the motor as long as the rotational speed of the output shaft has exceeded a negative peak during the first reversion period.

3. The system according to claim 1, wherein the electronic control unit is further configured to:
   calculate, based on the predicted at least one future value of the rotational speed of the output shaft, a timing at which the rotational speed of the output shaft is at least one of zero and a value close to zero,
   calculate, based on the calculated timing and engagement required time, a determination criterion point, and
   determine, based on a result of comparison between the determination criterion point and a timing of the engine restart condition being met, whether the pinion and the ring gear will be shifted to the engagement state therebetween during reverse rotation of the output shaft, the engagement required time being taken from the start timing to shift the pinion to the ring gear and to shift of the pinion and the ring gear to the engagement state therebetween.

4. The system according to claim 1, wherein, after the rotational speed of the output shaft reaches substantially zero, the output shaft of the internal combustion engine is rotated first in a reverse rotational direction during a first reversion period, and thereafter, is alternately rotated in the forward rotational direction and the reverse rotational direction, and the electronic control unit is configured to:
   when it is determined that the pinion and the ring gear will be shifted to the engagement state therebetween during forward rotation of the output shaft, start energization of the motor after a lapse of engagement required time since the start timing to shift the pinion to the ring gear, the engagement required time being taken from the start timing to shift the pinion to the ring gear and to shift of the pinion and the ring gear to the engagement state therebetween; and
   when it is determined that the pinion and the ring gear will be shifted to the engagement state therebetween during reverse rotation of the output shaft, after the lapse of the engagement required time since the start timing to shift the pinion to the ring gear, start energization of the motor as long as the rotational speed of the output shaft has exceeded a negative peak during the first reversion period.

5. The system according to claim 1, wherein, after the rotational speed of the output shaft reaches substantially zero, the output shaft of the internal combustion engine is rotated first in a reverse rotational direction during a first reversion period, and thereafter, is alternately rotated in the forward rotational direction and the reverse rotational direction, and the electronic control unit is configured to:
   start energization of the motor after a lapse of engagement required time since the start timing to shift the pinion to the ring gear, the engagement required time being taken from the start timing to shift the pinion to the ring gear and to shift of the pinion and the ring gear to the engagement state therebetween; and
   when it is determined that the pinion and the ring gear will be shifted to the engagement state therebetween during reverse rotation of the output shaft, start, via the engaging unit, to shift the pinion to the ring gear at a timing that allows the rotational speed of the output shaft by the motor energized based on the shift of the pinion to the ring gear to have exceeded a negative peak during the first reversion period.

* * * * *